C. E. SWENSON.
VALVE FOR INTERNAL COMBUSTION ENGINES.
APPLICATION FILED JULY 8, 1912.
1,077,317. Patented Nov. 4, 1913.
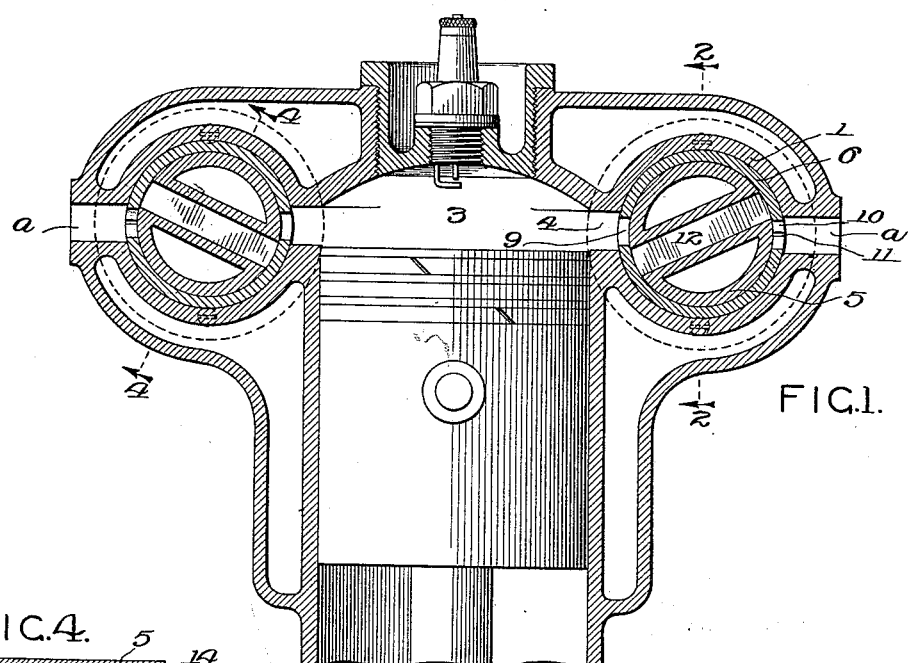
FIG.1.
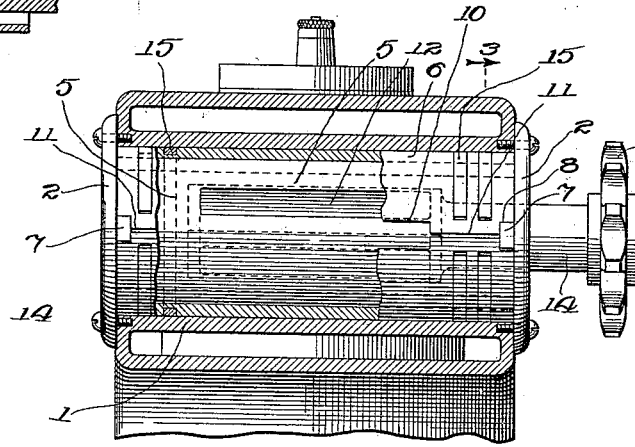
FIG.4.
FIG.2.
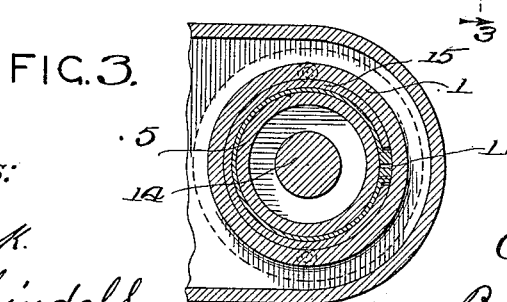
FIG.3.
Witnesses:
J. C. Devick.
George L. Chindahl
Inventor:
Carl E. Swenson.
By Luther L. Miller
Atty.

UNITED STATES PATENT OFFICE.

CARL E. SWENSON, OF ROCKFORD, ILLINOIS.

VALVE FOR INTERNAL-COMBUSTION ENGINES.

1,077,317. Specification of Letters Patent. Patented Nov. 4, 1913.

Application filed July 8, 1912. Serial No. 708,154.

*To all whom it may concern:*

Be it known that I, CARL E. SWENSON, a citizen of the United States, residing at Rockford, in the county of Winnebago and State of Illinois, have invented certain new and useful Improvements in Valves for Internal - Combustion Engines, of which the following is a specification.

This invention relates to valves of the rotary or oscillatory type.

The objects of the invention are to provide effectively for the expansion due to heat and to prevent loss of compression.

In the accompanying drawings, Figure 1 is a sectional view illustrating an internal-combustion engine provided with valves embodying the features of my invention. Fig. 2 is a sectional view taken in the plane of dotted line 2 2 of Fig. 1. Fig. 3 is a section on line 3 3 of Fig. 2. Fig. 4 is a section through the valve member, taken in the plane of dotted line 4 4 of Fig. 1, but on a reduced scale.

My invention may be applied to engines of any suitable cylinder construction, a common form being shown in the drawings. For the purpose of illustrating the invention, I have shown it as applied to an engine having separate intake and exhaust valves, but certain features of the invention are equally applicable to a valve serving for both inlet and exhaust.

In the construction herein shown a valve casing 1 is provided upon the engine cylinder, the ends of said valve casing being closed in any suitable way, as by means of plates 2. The interior of the valve casing is in communication with the cylinder or combustion chamber 3 through the medium of a passage 4. The valve casing may be cooled by means of a water jacket, as herein shown, or in any preferred manner. Within the valve casing 1 is mounted a cylindrical valve member 5, a sleeve 6 being interposed between the valve member and the interior walls of the valve casing. The sleeve 6 may be held against rotation in any suitable manner, as by means of lugs 7 on the plates 2, said lugs lying within notches 8 in said sleeve. The sleeve has an elongated opening 9 therein communicating with the passage 4; and at another point (as, for example, diametrically opposite the opening 9 as herein shown) the sleeve is provided with an elongated opening 10 communicating with the mixture supply or exhaust passage $a$, as the case may be. The sleeve 6 is completely severed or split along a line extending longitudinally of the sleeve at a suitable point; herein said sleeve is shown as severed along the line of the opening 10 by means of the slot 11. The sleeve is thus rendered yielding, or expansible and contractible, so as to conform to changes in the diameter of the valve member 5. To permit of such expansion of the sleeve, the latter has a free or easy fit within the casing 1. The valve member 5 has a port 12 extending diametrically therethrough and adapted to connect the openings 9 and 10. Said valve member may be turned by any suitable means. Herein I have shown it as arranged for continuous rotation in one direction by means of a sprocket wheel 13 attached to the spindle 14 of the valve member. The sprocket wheel 13 may be driven from any suitable shaft of the engine at a speed appropriate to the engine cycle, as, for example, at one-fourth of the crank-shaft speed in the case of a four-cycle engine.

To prevent leakage of gases along the periphery of the sleeve 6 and past the ends of said sleeve, I provide suitable means, as, for example, metallic split rings 15 lying within grooves formed in the periphery of the sleeve. As shown in Figs. 2 and 3 the ends of said grooves are closed, that is to say, they do not extend to or communicate with the slots 11, thereby preventing gas from leaking past the edges of the rings and escaping into said slots. The valve member 5 may be lubricated by any preferred means.

In operation, the split sleeve 6 yields or expands when the valve member 5 expands by reason of the heat to which it is subjected, and contracts as the valve member cools, thereby maintaining at all times a gas-tight fit between the sleeve and the valve member, and at the same time preventing sticking or undue tightness between the valve member and the sleeve. Rotation of the valve member is not interfered with by the pressure of the gases within the cylinder, since only that portion of the valve member which is behind the opening 9 is exposed to said gases during the period of explosion and expansion. The pressure of the gases within the cylinder, exerted upon that portion of the sleeve 6 which is exposed at the passage 4, tends to push the sleeve away from said passage and thus causes said sleeve to be pressed into gas-tight contact with the part of the valve casing which surrounds the opening $a$, thereby preventing leakage of gas through said opening $a$. The split rings 15 are of sufficient length to extend to the area of gas-tight contact just referred to, thus preventing leakage of gases past the ends of said rings.

I claim as my invention:

1. A valve construction for internal-combustion engines comprising a valve casing having inlet and outlet passages, an expansible and contractible split sleeve non-rotatably mounted within said casing and having openings communicating with said passages, a cylindrical valve member within said sleeve and having fluid-passage means arranged to communicate with the openings in the sleeve, and means for operating said valve member.

2. A valve construction for internal-combustion engines comprising a valve casing having an inner and an outer fluid-passage, an expansible and contractible split sleeve within said casing, the split side of the sleeve being adjacent to said outer fluid-passage, a valve member within said sleeve and having fluid-passage means arranged to communicate with the openings in the sleeve, and means for operating said valve member.

3. An internal combustion engine comprising a combustion chamber, a valve casing having diametrically opposite inner and outer fluid-passages, said inner passage communicating with the combustion chamber, an expansible and contractible split sleeve within said casing, adapted to be forced by the pressure within the combustion chamber against the wall of the valve chamber surrounding the outer fluid-passage, said sleeve having diametrically opposite openings registering with said passages; packing means between the sleeve and the valve casing; a cylindrical valve member within said sleeve and having fluid-passage means arranged to communicate with the openings in the sleeve; and means for turning said valve member.

4. A valve construction for internal-combustion engines comprising a valve chamber having inner and outer fluid-passages, a sleeve within said casing, said sleeve being longitudinally severed, and having openings communicating with said passages, said sleeve having peripheral arcuate grooves, the ends of said grooves terminating adjacent to the line of severance, said line being adjacent to said outer fluid-passage; split packing rings within said grooves; a cylindrical valve member within said sleeve adapted to connect said passages; and means for operating said valve member.

In testimony whereof I hereunto affix my signature in the presence of two witnesses.

CARL E. SWENSON.

Witnesses:
CHAS. COTTA,
WILLIAM JOHNSON.

---

Copies of this patent may be obtained for five cents each, by addressing the "Commissioner of Patents. Washington, D. C."